T. J. STURTEVANT AND E. A. SAWYER.
WEIGHING MACHINE.
APPLICATION FILED DEC. 10, 1917.

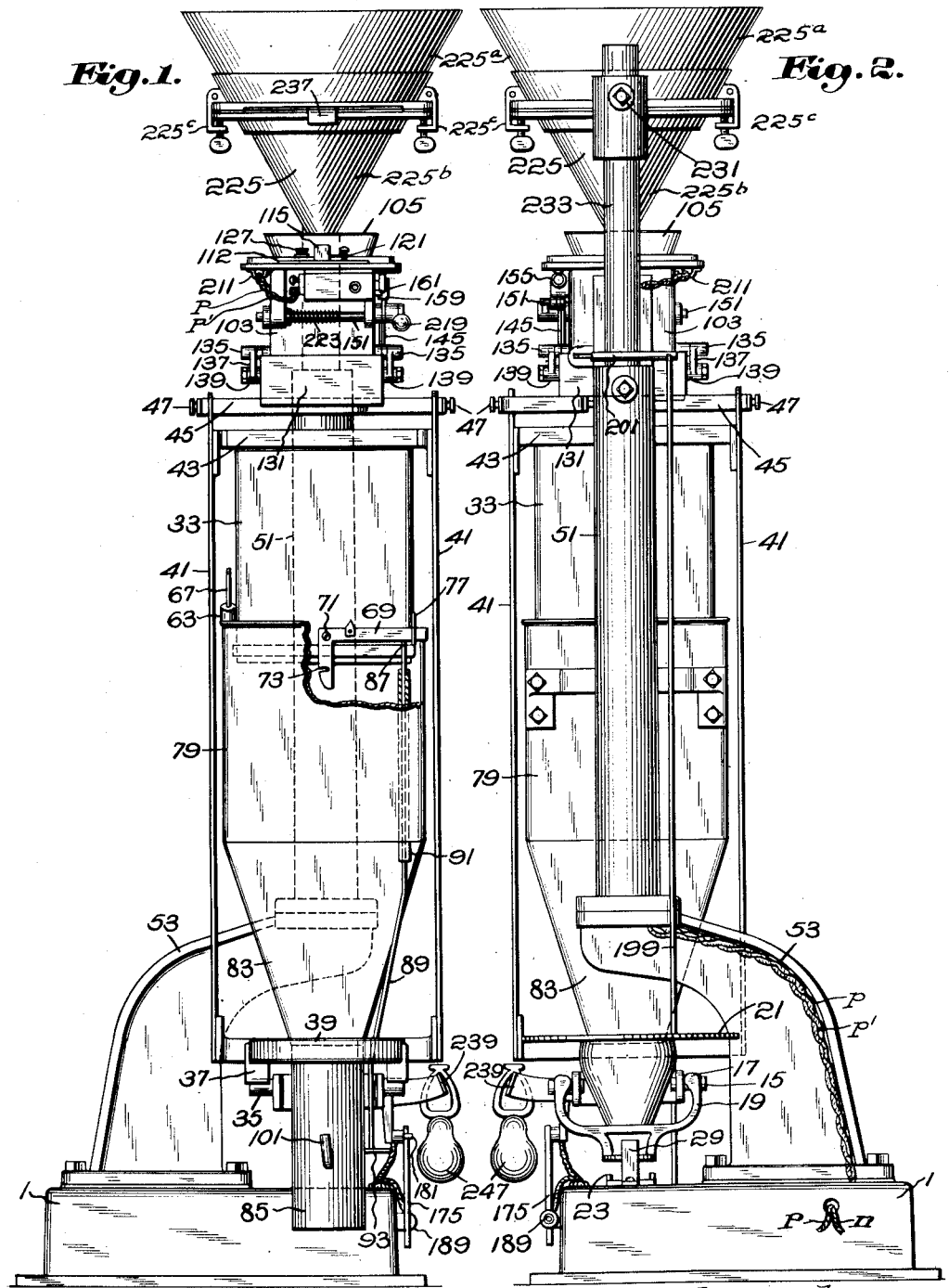

1,360,467.

Patented Nov. 30, 1920.
6 SHEETS—SHEET 2.

Inventor:
Thomas J. Sturtevant +
Edward A. Sawyer
by Robt. T. Hains.
Attorney.

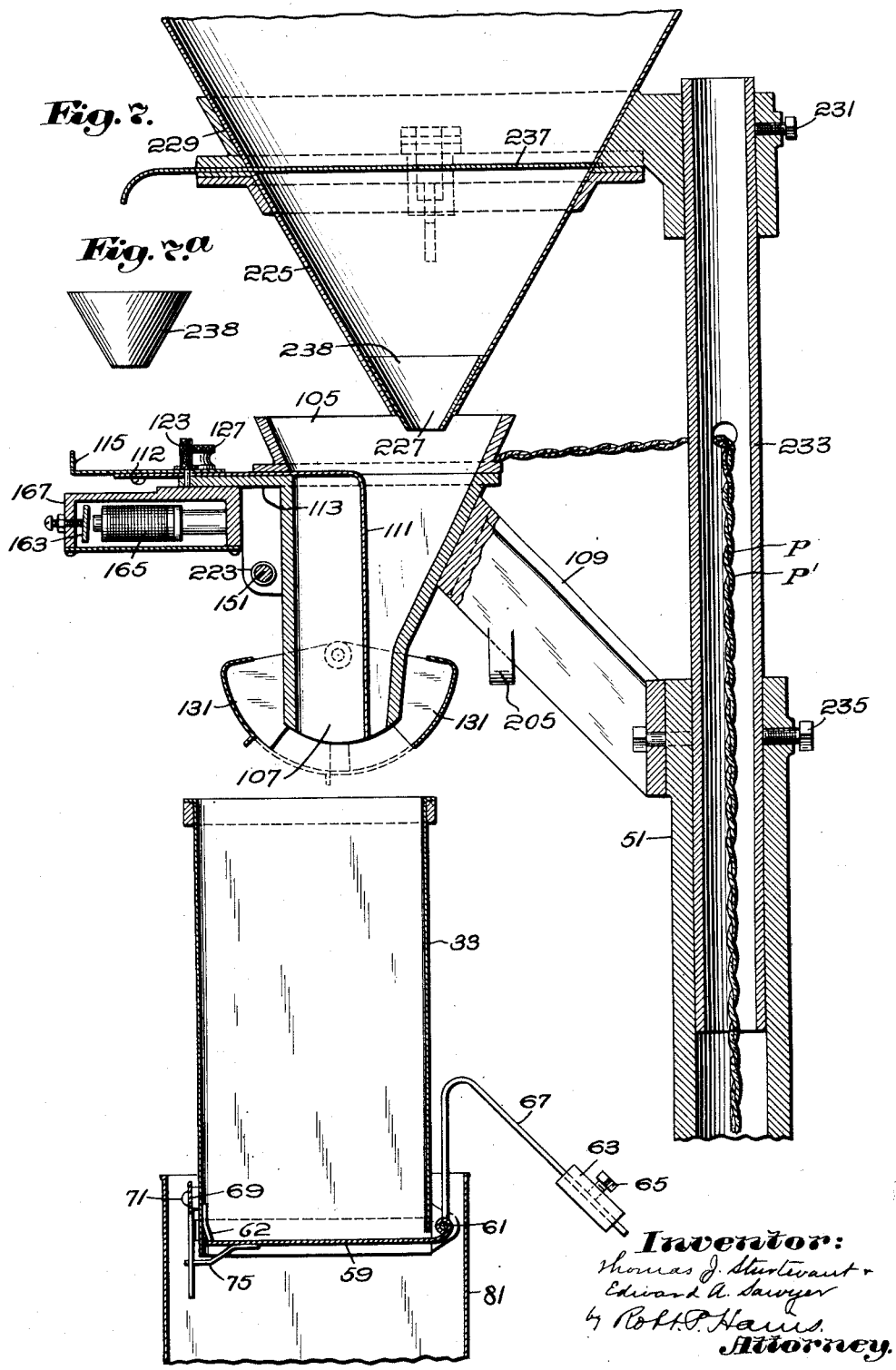

T. J. STURTEVANT AND E. A. SAWYER.
WEIGHING MACHINE.
APPLICATION FILED DEC. 10, 1917.

1,360,467.

Patented Nov. 30, 1920.
6 SHEETS—SHEET 4.

Inventor:
Thomas J. Sturtevant
Edward A. Sawyer
by Robt. P. _____
Attorney

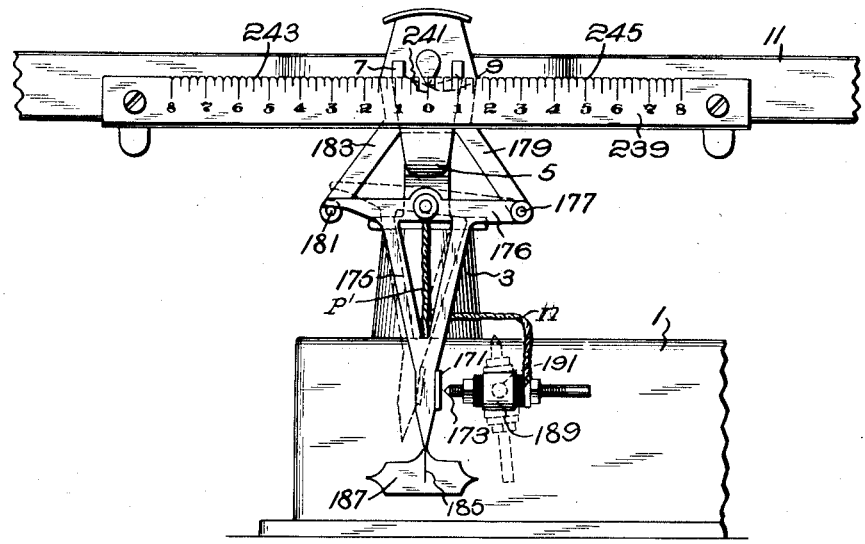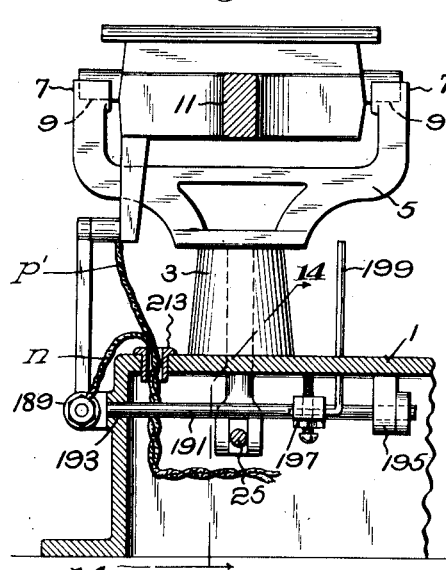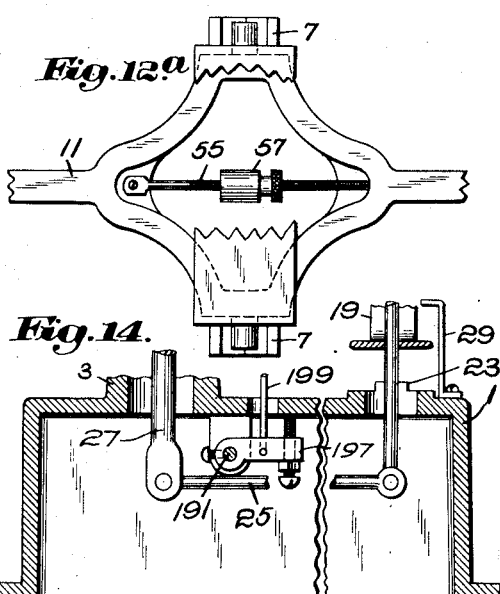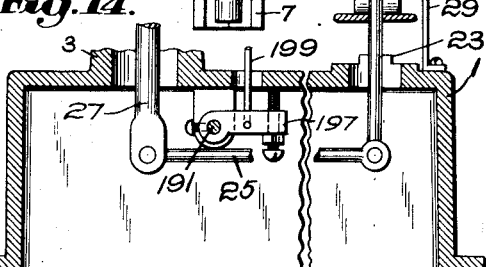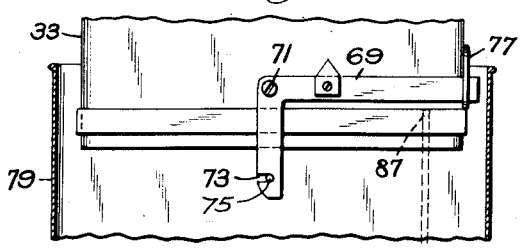

T. J. STURTEVANT AND E. A. SAWYER.
WEIGHING MACHINE.
APPLICATION FILED DEC. 10, 1917.

1,360,467.

Patented Nov. 30, 1920.
6 SHEETS—SHEET 6.

UNITED STATES PATENT OFFICE.

THOMAS J. STURTEVANT, OF WELLESLEY, AND EDWARD A. SAWYER, OF MALDEN, MASSACHUSETTS, ASSIGNORS TO STURTEVANT MILL COMPANY, OF BOSTON, MASSACHUSETTS, A CORPORATION OF MASSACHUSETTS.

WEIGHING-MACHINE.

1,360,467.   Specification of Letters Patent.   Patented Nov. 30, 1920.

Application filed December 10, 1917. Serial No. 206,397.

*To all whom it may concern:*

Be it known that we, THOMAS J. STURTEVANT and EDWARD A. SAWYER, citizens of the United States, residing at Wellesley, county of Norfolk, and Malden, county of Middlesex, and State of Massachusetts, respectively, have invented an Improvement in Weighing-Machines, of which the following description, in connection with the accompanying drawings, is a specification, like characters on the drawings representing like parts.

The invention hereinafter described relates to weighing machines, and more particularly to machines of the automatic type for successively weighing equal charges of material for delivery to bags, cartons or other containers.

In machines of this general character, the material to be weighed passes through a gate or valve of a hopper into a receptacle wherein it is weighed, and when the predetermined weight of material has been delivered therein, the receptacle descends slightly and tilts the weighing beam, thereby through suitable connections causing the gate or valve to close and shut off further supply of material to said receptacle. The material thus weighed is then discharged from the receptacle and the cycle of steps repeated for the next weighing operation.

When many successive charges of material are to be weighed it is important that the successive weighing operations should follow one another as closely as possible, in order that the operator of the machine may have a maximum output in a given time. The gate for the hopper cannot be opened until after the weighing receptacle has discharged its contents, and heretofore, the stream of material to be weighed has not been admitted to the hopper until after its gate has been opened. As a consequence, delay has occurred between successive operations, which while small between two operations, the aggregate is very considerable in a long series of operations.

One of the aims of the present invention is to eliminate the delay between the successive weighing operations. With this object in view the material may be fed continuously into the hopper and accumulate therein from the time the gate is closed until it is opened after the discharge of the material from the receptacle. When the gate is opened, the accumulated material is delivered suddenly to the receptacle and is followed by a stream or column of material sufficiently small to complete the weighing operation with the desirable delicacy. Thus, while the material is intermittently discharged from the hopper to the receptacle, as many successive charges are weighed as if the small stream of material flowed continuously into the receptacle.

After the receptacle descends to close the gate and complete a weighing operation, the column or portion of the material "in the air" beneath the closed gate, falls into the receptacle and adds somewhat to the weight. Another object of the invention is to provide simple and effective means for accurately compensating for this additional weight.

It is essential for accurate, prompt weighing that the material shall discharge quickly from the weighing receptacle and leave the walls thereof clean, without any residue to produce a variable factor in a series of weighing operations. Another object is to provide a weighing receptacle with walls and a discharge gate constructed and arranged so that the material will discharge instantly from the receptacle without leaving the objectionable residue referred to.

Another object is to provide means whereby the gate for the weighing receptacle may be alternatively opened automatically or manually at will.

Another object is to provide an improved gate or shutter for the hopper for delivering material to the weighing receptacle, whereby the shutter may close promptly and entirely on completion of a weighing operation without any dribble following its closure such as would add to the weight of the charges and prevent successive equal weights.

And still another object is to provide an electrical device for closing the gate or shutter of the hopper, having means for rubbing and keeping clean and efficient the make and break contacts in the electric circuit for said device; and to provide means to keep one of said contacts always out of range from the other excepting when the hopper shutter is opened to initiate a weighing operation, thereby effecting a saving in electricity.

The character of the invention may be best understood by reference to the following description of one good form thereof shown in the accompanying drawings, wherein:—

Figure 1 is an end elevation of the weighing machine selected as an embodiment of the invention;

Fig. 2 is an opposite end elevation of the machine;

Figure 5:
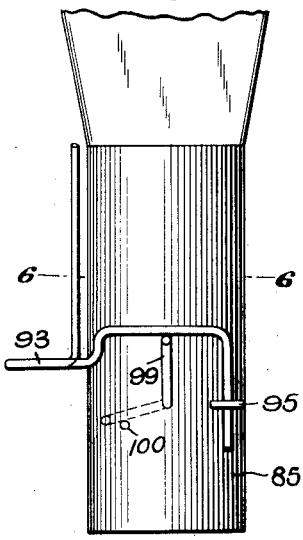
Figure 6:
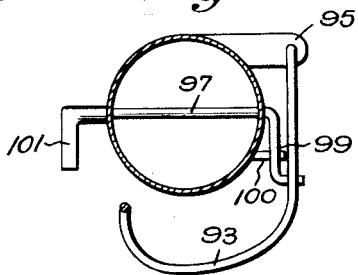
Figure 4:
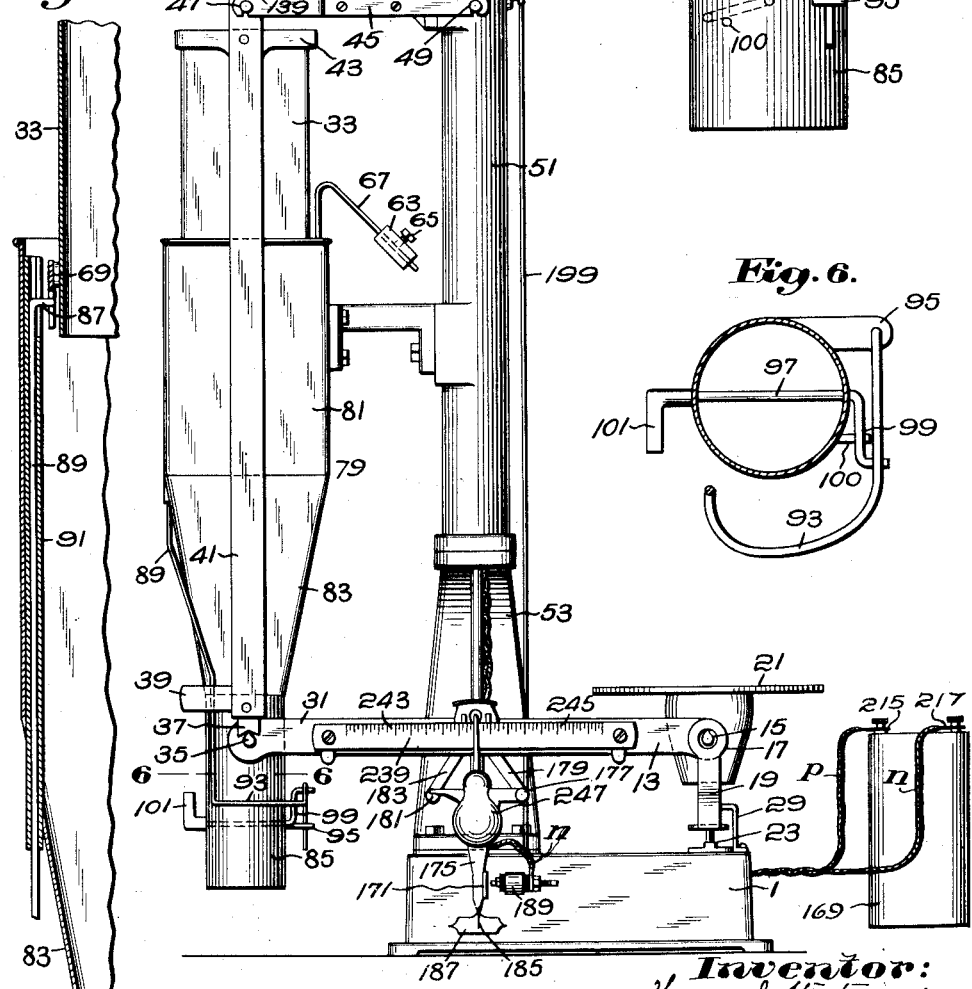
Figure 8:
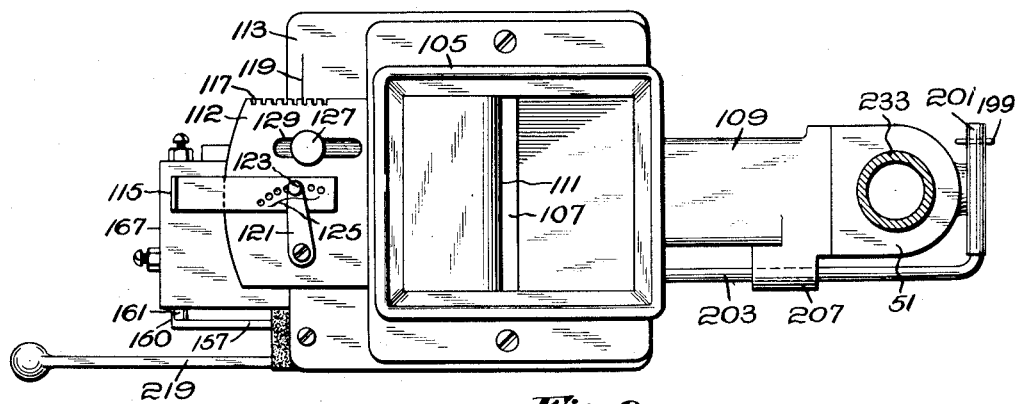
Figure 9:
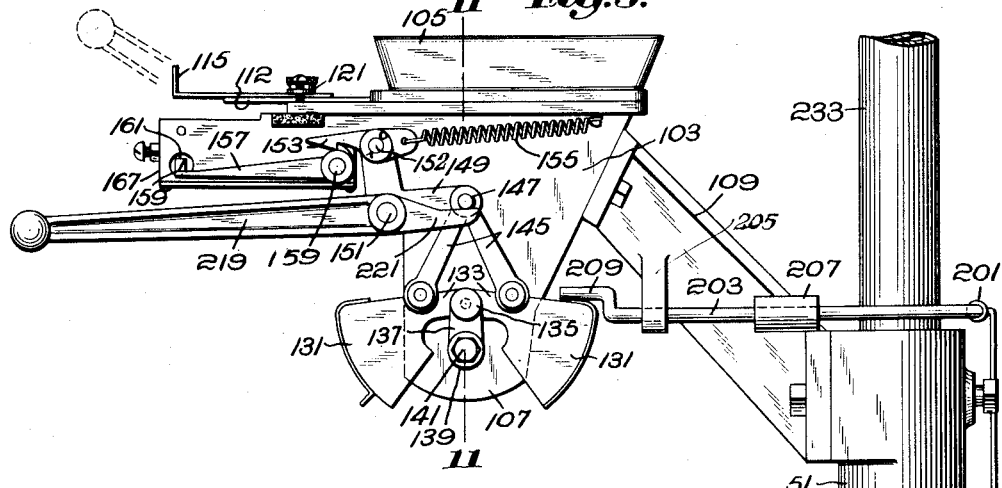
Figure 10:
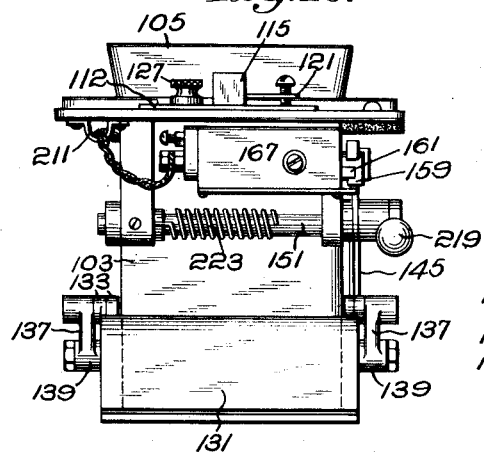
Figure 11:
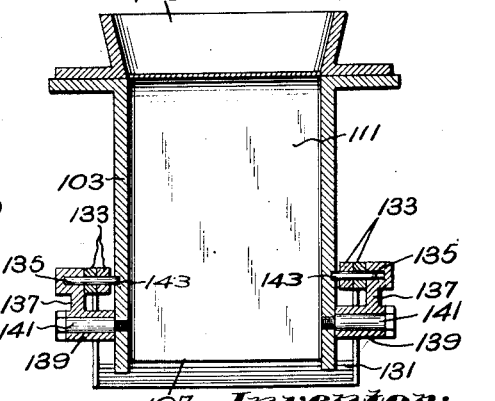

Fig. 4 on an enlarged scale is a vertical sectional detail of the controlling device for the latch for the gate of the weighing receiver;

Fig. 5 is a side elevation of a portion of the delivery chute and parts of the gate latch controlling device;

Fig. 6 is a horizontal section taken on line 6—6 of Fig. 5;

Fig. 7 on an enlarged scale is a vertical section through the feed hopper, the delivery hopper, the weighing receptacle, and a portion of the delivery chute for the latter;

Fig. 7ᵃ is a side elevation of a cone for varying the size of the port of the feed hopper;

Fig. 8 is a plan of the delivery hopper;

Fig. 9 is a side elevation of the delivery hopper showing the gate or shutter thereof and the controlling devices therefor;

Fig. 10 is a side elevation of the hopper and gate shown in Figs. 8 and 9;

Fig. 11 is a vertical section taken on line 11—11 of Fig. 9;

Fig. 12 on an enlarged scale is a front elevation of a portion of the weighing beam showing the tare scale therefor and the contacts for making and breaking the electrical circuit for the shutter latch of the delivery hopper;

Fig. 12ᵃ is a plan view showing a portion of the weighing beam and a weight adjustable on a screw carried by the beam for balancing the latter;

Fig. 13 is a vertical section through the weighing beam and a portion of the base of the machine disclosing means for moving one of the contacts into and out of range from the other;

Fig. 14 is a sectional detail taken on line 14—14 of Fig. 13;

Fig. 15 is a detail view of the latch for controlling the gate of the weighing receiver; and Figs. 16, 17, 18 and 19 are diagrams showing successive steps in a weighing operation.

Figure 3:
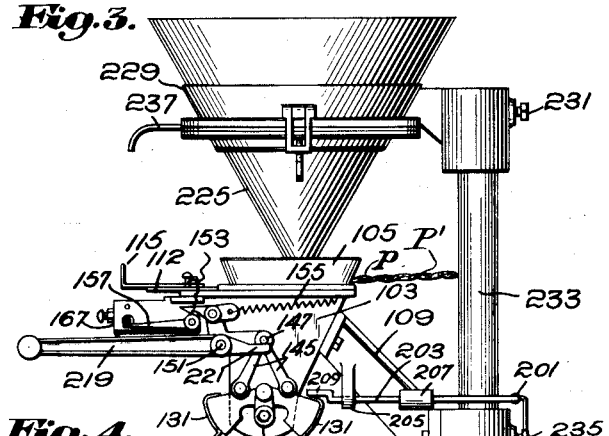
Fig. 3 is a front elevation of the machine.

Referring to the drawings, the weighing machine shown therein as an exemplification of the invention, comprises a suitable support, in the present instance, in the form of a base 1 (Figs. 1, 2, 3 and 13) having a post 3 rising therefrom supporting the yoke 5 having open bearings 7. Knife trunnions 9 are fulcrumed on said bearings and project laterally from a weighing beam 11 intermediate the ends thereof. One end of the beam terminates in a fork 13 (Fig. 3) having knife trunnions 15 projecting therefrom mounted in bearings 17 on the upper ends of the arms of a yoke 19 carrying a platform or support 21 adapted to receive the usual counterbalance weights. The yoke 19 has a stem 23 projecting down into the base 1 with its lower end connected by a pivoted link 25 with a stud 27 depending from the top of the base, the construction being such, that the platform will be maintained horizontal throughout the tilting movements of the beam. A stop 29 rising from the base has an offset end adapted to engage the base of the yoke 19 to limit upward movement of the platform.

The end of the beam opposite the platform terminates in a fork 31 (Fig. 3) carrying the weighing receiver 33. To accomplish this, in the present instance, the yoke 31 is provided with knife trunnions 35 supporting bearings 37 depending from a curved member 39. Opposed bars 41 are provided, having their lower ends connected to said curved member and their upper ends connected to a frame 43 carrying the receiver 33. To guide the receiver in its rising and falling movements, a rocker yoke 45 may be provided having arms detachably connected to pins 47 projecting from the bars 41 and having its stem pivotally connected to a pin 49 on a vertical standard 51 rising from a curved arm 53 mounted on the base of the machine.

The weight of the receiver and its supporting parts counterbalances the weight of the platform 21 and its supporting parts, so that the beam will balance when there is no load in the receiver or no weight on the platform. To insure perfect balance of the beam, it may carry a screw shaft 55 having a weight 57 threaded thereon (Fig. 12ᵃ).

The weighing receiver may be of any suitable construction. In the present instance, it has vertical parallel walls (Figs. 4 and 7) and open upper and lower ends. The lower or discharge end of the receiver may have a suitable valve or gate 59 of an area sufficient to close the discharge opening formed by the boundaries of the parallel walls of the receiver, so that when the gate is opened the material in the receiver may discharge quickly therefrom along the parallel walls thereof without leaving any residue material in the receiver to produce variation in the successive charges weighed by the machine. The gate 59 may be connected by a hinge 61 with the receiver, and may be normally closed against a stop 62 by a weight 63 adjustably secured by a screw 65 on a goose neck rod 67 secured to the gate.

To lock the gate in its closed position, a latch (Figs. 4, 7 and 15) may be provided conveniently in the form of a bell-crank 69 pivoted on a pin 71 on the receiver having an arm provided with a notch 73 adapted to receive a pin 75 (Fig. 7) projecting downward and laterally from the gate 59. The long arm of the bell-crank tends to rock the latch in a clockwise direction (Fig. 15) into engagement with the pin 75, the movements of said long arm being limited by a guard 77 secured to the receiver.

The receiver may discharge its contents into a bag, carton or other container. To conduct the material thereto, a chute 79 (Figs. 1, 2, 3 and 7) may be provided having a box-like portion 81 and a tapered lower end portion 83 terminating in a cylindrical neck or spout 85.

The latch for the weighing receiver gate may be opened manually or automatically on descent of the receiver at will. To control the latch, a trip member 87 (Figs. 4 and 15) may be provided projecting laterally inward beneath the long arm of the bell-crank latch, said trip member being mounted on the upper end of a vertical rod 89 projecting downward through a tube 91 in the box-like portion of the chute, the lower end of said tube projecting outward from the chute adjacent the juncture of the tapered portion thereof with the box-like portion thereof. The rod 89 may be bent inward and downward to follow the contour of the chute, and have a lower portion 93 (Fig. 6) curved laterally transversely to the spout 85 and thence downward through a hole in a guide bracket 95. The rod may be shifted upward to a position where its trip member will be engaged by the latch to automatically release the same to open the gate when the receiver descends, or it may be shifted downward to a position where it will be out of range from said latch when the receiver descends. To adjust the rod to these positions, a shaft 97 (Fig. 6) may project transversely through the chute neck 85 and have a crank 99 at one end thereof adapted to engage the under side of the transverse portion 93 of the rod. The opposite end of the shaft may have a handle 101 thereon. The construction described is such that the handle may be rocked to shift the rod to bring the trip member in a position to automatically release the latch and open the gate on descent of the receiver, or the handle may be operated to lower the trip member 87 out of range of said latch. In the latter case, the handle may be rocked to shift the trip member upward and manually trip the latch after the receiver has descended.

Suitable means may be provided to deliver the material to be weighed to the receiver. To accomplish this, a delivery hopper 103 (Figs. 7-10) may be provided having a flaring mouth 105, and a downwardly tapered body terminating in a discharge port 107.

This hopper may be mounted on a bracket 109 projecting laterally from and secured to the standard 51, referred to. To vary the size of the port 107, and the capacity of the hopper, an adjustable wall 111 may be mounted therein and project substantially the length of the body of the hopper. To adjust and hold this wall in position, its upper end may be bent laterally outward through one side of the hopper presenting a plate 112 resting upon a shelf 113 secured to the hopper. To facilitate adjustment of the wall, a handle 115 may be secured to said plate. To indicate the adjustment of said wall, the plate may have a scale 117 thereon provided with numbered graduations adapted to be read in connection with an index line 119 marked on the upper surface of said ledge. To further facilitate adjustment of said wall and plate, an arm 121 (Fig. 8) may be pivotally mounted on said plate and have a pin 123 adapted to project through any selected hole of a series of holes 125 in said plate, and thence to the edge of said shelf beneath said plate. To secure the plate in its different positions of adjustment, a thumb screw 127 may be entered through an elongated slot 129 in said plate and be tapped into said shelf. The construction is such that the wall may be adjusted to vary the capacity of the hopper and the size of the column or stream of material delivered therefrom to the weighing receiver. The wall may be sufficiently flexible to be bent to fixed positions to vary the capacity without varying the size of the column, or to vary the size of the column without varying the capacity. For example, the lower end of the wall may be bent either toward or from the opposite fixed wall of the hopper in order that the discharge opening of this hopper may be given a desired size irrespective of the adjustment of the upper portion of the vertical wall 111.

To control the discharge of material from the hopper, a suitable valve or gate may be provided, in the present instance, in the form of a shutter comprising sections 131 (Figs. 7-11) having arms 133 pivoted on pins 135 carried by arms 137 projecting upward from stud sleeves 139 on screws 141 tapped into opposed walls of said hopper. To prevent rocking of the arms 137 about the screws 141, the inner ends of the pins 135 may project into depressions 143 in the opposed walls of the hopper. The construction is such that the shutter sections may be easily connected to the hopper with a strong, efficient mounting. To open and close the shutter, the arms 133 of the sections may be connected to the lower ends of links 145, the upper ends of which are connected by a pin 147 with one arm of a bell-crank 149 fulcrumed on a shaft 151 mounted on the hopper. The other arm of the bell-crank has a pin 152 carrying a latch 153 having a heel connected to one end of a coil spring 155, the opposite end of which is anchored to the hopper. The construction is such that the spring tends to rock the bell-crank in a clockwise direction and close the shutter.

To hold the shutter sections in open position, the latch 153 is adapted to engage a dog 157 pivoted on a pin 159 mounted on the hopper. This dog has a laterally projecting finger 160 (Fig. 8) adapted to be engaged by a trigger 161 to hold the dog in position to interlock with the latch and hold the gate open. To trip the trigger, it may be mounted on the armature 163 of an electromagnet 165 mounted in a box 167 (Fig. 7) secured to the hopper conveniently beneath the shelf 113 thereof.

The electromagnet should be energized to attract its armature, trip the trigger, release the latch and allow the spring to close the shutter promptly on descent of the weighing receiver to complete the weighing operation. To accomplish this, a suitable electric circuit may be provided comprising a battery 169 or other suitable source of electricity, a conductor P leading therefrom to one of the terminals of the electromagnet and a conductor P' leading from the other terminal of said magnet to a contact 171 controlled by the beam and adapted to engage a contact 173 connected by a conductor n with the battery 169. In the present instance of the invention, the contact 171 is on a pendulum 175 (Figs. 4 and 12) depending from a bar 176 having one end pivotally mounted on a pin 177 on an arm 179 depending from the weighing beam. The other end of said bar is adapted to rest upon a pin 181 on an arm 183 depending from said beam. The lower end of the pendulum is adapted to register with an index line 185 on a plate 187 on the machine base when the weighing beam is in balanced position.

The contact 173 is in the form of a pin carried by a block 189 fast on one end of a shaft 191 (Fig. 13) journaled in a bearing 193 in the front wall of the machine base and in a bearing in a lug 195 depending from the top of the base into the interior thereof. To rock the contact 173 out of range from the pendulum contact 171 when the shutter closes, the shaft 191 may be provided with a crank 197 (Fig. 13) connected to the lower end of a rod 199 (Figs. 2, 9 and 13) projecting upward through the top of the base parallel to the standard 51 and having its upper end connected to a crank 201 on a shaft 203 journaled in bearings in lugs 205 and 207 on the hopper bracket 109, referred to. A crank 209 projects over one of the shutter sections 131, so that when the shutter is opened, said section will engage said crank and the shaft 203 will be rocked to depress the vertical rod 199 and rock the shaft 191 to shift the contact 173 down to its position shown in full lines in Fig. 12 where it is in range of the pendulum contact 171. When the shutter is closed, it will move down from the crank 209 and the weight of the rod 199 will rock the contact 173 up to its position shown in dotted lines in Fig. 12 where it is out of range of the contact 171. In the course of this movement, the contact 173 will wipe along the contact 171 and thereby maintain said contacts in clean, efficient condition to insure reliable operation.

When the weighing receiver descends after the predetermined weight of material has flowed therein, the pendulum 175 is rocked by the beam to cause the contact 171 to engage the contact 173, thereby completing the circuit to the electromagnet, energizing the latter, and attracting its armature. This pulls the trigger 161 away from the locking dog 157 and allows the spring 155 to snap the shutter sections together and cut off further flow of material from the hopper to the weighing receiver with a sharp quick movement preventing any possibility of material dribbling between said sections after the closure thereof. The conductors in the circuit for the electromagnet may be led therefrom over a hanger 211 (Fig. 10) secured to the hopper shelf 113 and led thence along the hopper bracket 109 down through the standard 51 into the machine base 1 and out through a port 213 (Fig. 13) in the top of said base to the contacts 171 and 173. Terminals 215 and 217 of the conductors may project outward through one side of the base and be connected to the battery 169 or other suitable source of electricity.

When the weighing receiver descends and tilts the beam in a contra-clockwise direction (Fig. 12), the pendulum contact 171 is brought into engagement with the contact 173, but the engagement of said contacts will not restrict a further tilting of the beam, since the bar 176 will rock on its pivot up from the pin 181 somewhat in the course of this movement. Thus, the engagement of said contacts is maintained to insure completion of the circuit to energize the electromagnet and close the shutter on the completion of the weighing operation.

When it is desired to initiate the next weighing operation, the shutter should be opened to allow the material to flow from the hopper into the weighing receiver. To accomplish this, a hand lever 219 (Figs. 8, 9 and 10) may be pivoted on the shaft 151, referred to, and have a toe 221 adapted to engage a portion of the pin 147, referred to, projecting laterally outward somewhat from the shutter links 145. When the hand lever is depressed, said toe will engage said pin and lift said links to open the shutter. In the course of this movement the bell-crank 149 will be rocked in a contra-clockwise direction (Fig. 9) until the latch 153 engages the lock dog 157 therefor. The shutter is retained in this open position until automatically closed by the energization of the electromagnet on the descent of the weighing receiver as described.

To relieve the spring 155, referred to, from the work of rocking the hand lever 219 upward on closure of the shutter, a torsion spring 223 (Fig. 10) may be mounted on the shaft 151 for said lever and have one end fast on said shaft and its other end anchored to the hopper. The construction is such that the spring will rock said shaft and return the hand lever to its upward position where it will be in readiness to open the shutter. The shutter sections are snapped together with a sharper, quicker movement than if said spring 155 was obliged to also elevate said lever.

In order to accurately weigh the charges, the material should flow into the weighing receiver in a small column or stream when the receiver is about to descend. If a large stream or column is fed, variation in the density of the stream may be so great as to produce substantial variation in the weights of the successive charges, but if a small stream is fed, these variations become so slight as to be negligible. If the entire charge of material is fed to the weighing receiver in the form of the final small stream or column, it renders the taking of the weight of successive charges objectionably slow. To expedite the weighing operation, the material is sometimes fed through a large passage to supply the principal portion of the charge, and then the final stream of material to complete the weighing operation is fed through a relatively small passage. This method of weighing, however, has been found to be objectionable, since certain classes of granular material are liable to adhere to the walls of the small passage and choke the same more or less, thereby producing a variable factor preventing accurate weighing.

Next will be described means whereby the principal portion of the charge may be quickly delivered to the weighing receiver and be followed by the desirable small stream to complete the weighing operation without the objection referred to. To accomplish this, in the present instance of the invention, a feed hopper 225 (Figs. 1, 2, 3 and 7) may be provided conveniently of tapered form terminating in a discharge port 227 at the lower end thereof. This hopper may be formed of sections 225$^a$ and 225$^b$ carried by a ring bracket 229 embracing the same and adjustably held by a screw 231 on a post 233 adapted to telescope into the standard 51 and be secured by a screw 235 in different positions of adjustment therein. To control the feed of material through this hopper, it may have a slide gate 237 adapted to cut through the same at a point a substantial distance above the discharge port. The lower section may be removably secured to the upper section by swing bolts 225$^c$, or other suitable means.

The size of the discharge port determines the size of the final stream of material fed to the delivery hopper and thence to the weighing receiver. The appropriate size of this final stream may vary with different materials to be weighed, and to provide ports of different sizes, the hopper may be provided with cones having smaller or larger ports, such for example as the cone 238 (Figs. 7 and 7$^a$) which may be inserted into the lower hopper section. The material may be fed in a continuous stream to the feed hopper by a pipe or other means not shown herein.

In operation, the shutter being open, the material will be fed from the feed hopper directly through the delivery hopper into the weighing receiver until a sufficient charge is supplied to the receiver to depress the same. Then the shutter is automatically closed as described to cut off further feed to the receiver. The charge in the receiver will be then delivered therefrom to and through the chute to the container not shown but positioned beneath the chute. The gate for the weighing receiver will be automatically or manually opened according to the adjustment of the trip member as described. The gate is then automatically closed by its weight 63 and the receiver rises in readiness to receive the next charge.

To prevent delay between successive weighing operations, the material may flow continuously from the feed hopper into the delivery hopper while the gate of the weighing receiver is opened to discharge its contents, while the weighing receiver is rising in readiness to receive the next charge, and while the operator is getting ready to open the shutter to initiate the next weighing operation. At the desired time the operator depresses the hand lever 219, thereby opening the shutter as described, and the material which has accumulated in the delivery hopper between weighing operations is then suddenly delivered to the weighing receiver, and is followed by the relatively small stream of material flowing directly from the feed hopper through the delivery hopper into the weighing receiver to complete the weighing operation. Thus, normally a continuous stream of material flows from the feed hopper, and as a result, in effect a continuous series of weighing operations may be performed, thereby enabling the weighing of a maximum number of charges in a given time.

It will be noted that the final stream of material flows through a relatively sharp edge port 227 without requiring a small long passage therefor, and without the liability of the material adhering to the passage and producing objectionable variation in the weighing, referred to.

After the shutter closes on descent of the weighing receiver, there necessarily occurs a stream or column of material "in the air" beneath the gate and above the upper surface of the material in the receiver. To compensate for the additional weight of this column, suitable means may be provided in the present instance in the form of a bar 239 (Fig. 12) mounted on the weighing beam and having a mid or zero graduation 241 registering with the knife trunnions 9 of the weighing beam. These graduations are marked to provide scales 243 and 245 leading in opposite directions from the mid graduation. A poise 247 (Fig. 3) is suspended on and adjustable along this bar. To determine the weight of the column in the air, the poise is adjusted to the zero graduation, and after the weighing receiver has descended, it is adjusted along the scale 245 to measure the amount of the tare or weight of the material in the air, and then adjusted an equal distance from the mid graduation along the scale 243 to compensate for the tare. The construction is such that the tare is accurately compensated for and successive equal weights are assured.

Figure 16:
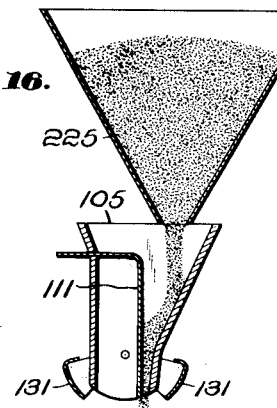
Figure 17:
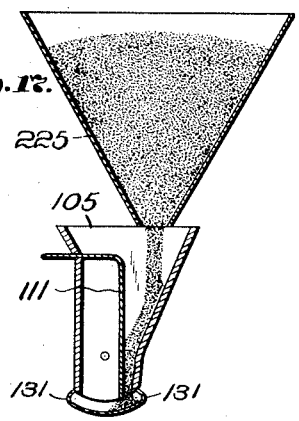
Figure 18:
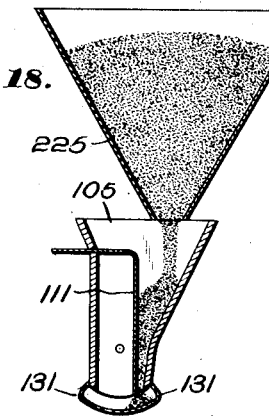
Figure 19:
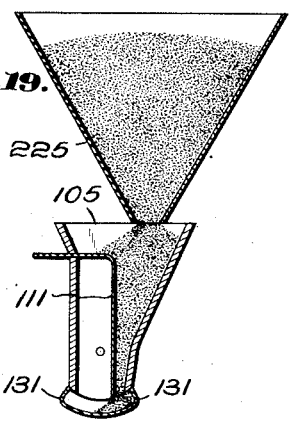

The cycle of steps in the weighing operation may be readily understood by reference to Figs. 16, 17 and 18. Fig. 16 shows the gate of the delivery hopper open and the gate of the weighing receiver closed with the stream of material flowing from the feed hopper through the delivery hopper into the weighing receiver. Fig. 17 shows the gate of the delivery hopper closed after the weighing receiver has descended to complete the weighing operation, and the material accumulating in the delivery hopper above its closed shutter between successive weighing operations. Fig. 18 shows the gate of the weighing receiver open to discharge its contents while the material continues to accumulate in the delivery hopper.

Where the gate of the weighing hopper is opened manually to discharge the contents thereof, in some cases there may be such a delay between successive weighing operations that it will be necessary to interrupt the feed from the feed hopper to the delivery hopper, in order that the amount of material accumulating in the delivery hopper shall not exceed the predetermined charge, but shall remain somewhat less than said charge, so that when the shutter is finally opened, the small stream may flow from the feed hopper into the weighing receiver to complete the weighing operation. To automatically interrupt the feed under such conditions, the feed hopper may be adjusted to such a position with respect to the delivery hopper that the material in the latter will rise up to the port of the feed hopper (Fig. 19) and choke the same and prevent further material from flowing therethrough when an amount of material has accumulated in the delivery hopper which is somewhat less than the charge to be weighed. And in order to further control this desired choking off of the flow of material from the feed hopper to the delivery hopper the wall 111 of the delivery hopper may be adjusted to vary the capacity of this hopper as above pointed out.

It will be understood that the invention is not limited to the specific embodiment shown, but that various deviations may be made therefrom without departing from the spirit and scope of the appended claims.

What is claimed is:—

1. A weighing machine comprising, in combination, a support, a feed hopper, a delivery hopper and a chute all carried by said support in vertical alinement, said feed hopper adjustable relative to said delivery hopper, a weighing beam on said support, a weighing receiver carried by said beam above the same and between said delivery hopper and chute, a shutter for said delivery hopper, means controlled by said beam automatically to close said shutter when a charge of predetermined weight has entered the receiver from the delivery hopper, and a swing gate for delivering the charge from said receiver to said chute.

2. A weighing machine comprising, in combination, a support, a feed hopper, a delivery hopper beneath said feed hopper, a weighing receiver beneath said delivery hopper, a chute extending beneath said receiver, a weighing beam mounted on said support, a pair of upright members extending along said chute and having upper ends connected to said receiver and lower ends fulcrumed on said beam, a shutter for said delivery hopper, and means controlled by said beam for automatically closing said shutter on entrance of a charge of predetermined weight into said receiver.

3. A weighing machine comprising, in combination, a support, a weighing beam mounted on said support, a weighing receiver, a chute for receiving materials from said weighing receiver, a member extending along the chute having its lower end fulcrumed on said beam and its upper end connected to said receiver to support the latter, and a guide member connected to said support and receiver to hold the latter upright while permitting weighing movements of said receiver.

4. A weighing machine comprising, in combination, a support, a weighing beam mounted on said support, a chute secured to said support, a carrier on said beam projecting up along said chute, a weighing receiver on said carrier and projecting into said chute, and a guide member extending from said receiver to said support and detachably connected to one of them that the receiver and its carrier may be removed from said beam and chute.

5. A weighing machine comprising, in combination, a support, a weighing beam mounted on said support, a chute on said support, a delivery hopper on said support, a weighing receiver to receive materials from said hopper and discharge the same into said chute, a discharge gate for said receiver, a latch for said gate, and a member on and extending along said chute operable from a point remote from said latch to positions for automatically or manually opening said gate to discharge materials from said receiver.

6. A weighing machine comprising, in combination, a feed hopper, a delivery hopper to receive materials from said feed hopper, a gate adjustable to permit or prevent flow of materials through said feed hopper, a shutter for said delivery hopper, a weighing beam, a weighing receiver carried by said beam beneath said delivery hopper, and means controlled by said beam for automatically closing said shutter when a charge of predetermined weight has entered said receiver from said delivery hopper.

7. A weighing machine comprising, in combination, a delivery hopper having a discharge port, a wall mounted within the sides of said hopper adjustable to vary the effective opening of said port without disturbing the boundary of said port, a shutter having two parts adapted to snap together to cut off the feed of materials through said port, a weighing beam, a weighing receiver mounted on said beam for receiving materials from said hopper, and means controlled by said beam for automatically closing said shutter when a charge of predetermined weight has entered said receiver.

8. A weighing machine comprising, in combination, a support, a weighing beam mounted on said support, a weighing receiver carried by said beam, a delivery hopper above said weighing receiver and having a discharge port, a feed hopper having a discharge port a sufficient distance above the port of the delivery hopper, that the latter may receive the major part of a charge before delivery thereof to the receiver, said feed hopper port being much smaller than the delivery hopper port to deliver a small final stream through the delivery hopper port to the receiver to complete the charge, a shutter for said delivery hopper port, and electrical means operated by the beam automatically to close said shutter and interrupt the flow of the final stream to the weighing receiver.

9. A weighing machine comprising, in combination, a support, a weighing beam mounted thereon, a weighing receiver carried by said beam, a delivery hopper above said receiver having a discharge port, a feed hopper having a port smaller than said discharge port to deliver a small final stream of material through the port of said delivery hopper to said receiver to complete a charge of predetermined weight, a shutter for said delivery hopper port, means operated by the beam automatically to close said shutter to interrupt said final stream on entrance of the predetermined charge into the receiver, a gate for the receiver, and means automatically to open said gate to discharge the charge from the receiver and allow the latter to move up toward the delivery hopper in readiness to receive the next charge of material.

10. A weighing machine, comprising, in combination, a support, a weighing beam mounted thereon, a weighing receiver connected to said beam, a delivery hopper above said weighing receiver, means to control the discharge of material from the delivery hopper, a feed hopper for the latter having a port therein, and means to position said port at different elevations to automatically interrupt the feed to the delivery hopper when different quantities of material in the latter rise to the level of said port.

11. A weighing machine, comprising, in combination, a support, a weighing beam mounted thereon, a weighing receiver, carried by said beam, a hopper to deliver material to said receiver, a shutter to control the discharge from said hopper, and electrical means automatically to close said shutter including a circuit, contacts therein for making and breaking the circuit, and means operated by the shutter for causing one of said contacts to rub or wipe along the other to keep their surfaces in polished efficient condition.

12. A weighing machine, comprising, in combination, a weighing beam, a weighing receiver connected thereto, a hopper for delivering material to said receiver, a gate for said hopper, and electrical means for closing said gate including an electric circuit having a contact moved by the beam and a contact adjacent thereto; and means for automatically moving said second named contact out of reach of said first named contact when the gate is closed.

13. A weighing machine, comprising, in combination, a weighing beam, a weighing receiver connected thereto, a hopper for delivering material to said receiver, a gate for said hopper, manually operable means for opening said gate, and electrical means for closing said gate including an electric circuit having a contact moved by the beam and a contact adjacent thereto; and means for automatically moving the latter into reach of said beam actuated contact when said gate is opened and out of reach thereof when said gate is closed.

14. A weighing machine, comprising, in combination, a support, a weighing beam mounted thereon, a weighing receiver connected to said beam, a delivery hopper for said receiver, a shutter for said hopper comprising sections, stud screws threaded to said hopper, sleeves on said screws having arms, fulcrum pins for said sections carried by said arms, a rocking member pivotally mounted on said hopper, links connecting said sections with said rocking member, means tending to rock said member to close said sections, and means to rock said member to open said sections.

15. A weighing machine, comprising, in combination, a support, a weighing beam mounted thereon, a weighing receiver connected to said beam, a delivery hopper for said receiver, a shutter for said hopper comprising sections pivotally mounted on said hopper, spring means tending to close said sections, a hand lever for opening said sections, and spring means tending to return said lever to its normal position independently of the closing of said sections.

16. A weighing machine, comprising, in combination, a weighing beam thereon having a mid graduation thereon and scales extending in opposite directions therefrom, a weighing receiver, a hopper for accumulating and delivering material to said receiver, a feed hopper for feeding a tare stream of material through said delivery hopper to said receiver, a gate for said delivery hopper, means for automatically closing said gate on a weighing movement of said beam, and a poise movable from said mid graduation along one of said scales to measure the tare from material in the air after closure of said gate, said poise being movable an equal distance from said mid-graduation along the other scale to compensate for said tare.

17. A weighing machine comprising, in combination, a feed hopper, a delivery hopper beneath said feed hopper, a weighing receiver beneath said delivery hopper, a wall mounted within said delivery hopper and adjustable to vary the capacity of the same, said feed hopper positioned to have the flow of material therefrom choked by the accumulation of an amount of material within said delivery hopper corresponding to the adjustment of said wall.

18. A weighing machine comprising, in combination, a weighing beam, a weighing receiver carried thereby, a gravity operated pendulum pivotally mounted upon said beam, a hopper for delivering material to said receiver, a gate for controlling the discharge from said hopper, and electrical means controlled by said beam for closing said gate, said means including an electric circuit having a contact moved by said beam and a contact adjacent thereto, said pendulum having said first mentioned contact carried thereby and positioned to be yieldingly held in engagement with said second mentioned contact during the downward movement of said pendulum.

In testimony whereof, we have signed our names to this specification.

THOMAS J. STURTEVANT.
EDWARD A. SAWYER.